US008840136B2

(12) United States Patent
Masatsugu et al.

(10) Patent No.: US 8,840,136 B2
(45) Date of Patent: Sep. 23, 2014

(54) MOUNTING STRUCTURES FOR FRONT PILLAR TRIMS

(75) Inventors: Toshikatsu Masatsugu, Aichi-ken (JP); Hiroyuki Seto, Aichi-ken (JP); Takahiro Narikiyo, Aichi-ken (JP)

(73) Assignee: Howa Textile Industry Co., Ltd., Aichi-ken (JP)

( * ) Notice: Subject to any disclaimer, the term of this patent is extended or adjusted under 35 U.S.C. 154(b) by 0 days.

(21) Appl. No.: 13/818,436

(22) PCT Filed: Aug. 8, 2012

(86) PCT No.: PCT/JP2012/070218
§ 371 (c)(1),
(2), (4) Date: Feb. 22, 2013

(87) PCT Pub. No.: WO2013/027583
PCT Pub. Date: Feb. 28, 2013

(65) Prior Publication Data
US 2014/0159351 A1 Jun. 12, 2014

(30) Foreign Application Priority Data
Aug. 22, 2011 (JP) .................................. 2011-180469

(51) Int. Cl.
*B60R 21/213* (2011.01)
*B60R 13/02* (2006.01)
*B60N 3/02* (2006.01)
*B60R 21/215* (2011.01)

(52) U.S. Cl.
CPC .............. *B60R 21/213* (2013.01); *B60N 3/026* (2013.01); *B60R 2021/21518* (2013.01); *B60R 13/025* (2013.01)
USPC ...................... 280/730.2; 280/728.3; 296/1.02

(58) Field of Classification Search
USPC .............................. 280/730.2, 728.3; 296/1.02
See application file for complete search history.

(56) References Cited

U.S. PATENT DOCUMENTS 7,850,197 B2 * 12/2010 Zucal et al. ................. 280/728.3
7,922,189 B1 * 4/2011 Dillon et al. ................ 280/728.1
(Continued)

FOREIGN PATENT DOCUMENTS

JP 09315253 12/1997
JP 11115674 4/1999
(Continued)

OTHER PUBLICATIONS

International Search Report and Written Opinion dated Oct. 4, 2012 for International Application No. PCT/JP2012/070218 (7 pgs.).

*Primary Examiner* — Ruth Ilan
(74) *Attorney, Agent, or Firm* — Timothy S. Westby; Porter Hedges, LLP (57) ABSTRACT

A front pillar trim mounting structure has a front pillar (10), a front pillar trim (30), an airbag (60), and an assist grip (70). The front pillar is provided in the front portion of a vehicle. The front pillar trim (30) covers the front pillar (10) from the inner side of the vehicle. The airbag (60) is located between the front pillar (10) and the front pillar trim (30). The assist grip (70) is attached to the front pillar (10), and is installed on a vehicle inner surface of the front pillar trim (30). The front pillar trim (30) has a first front pillar trim (40), a second front pillar trim (50), and an engagement mechanism (54). The assist grip (70) is installed on the first front pillar trim (40). The second front pillar trim (50) is provided with an opening where the first front pillar trim (40) is installed. The engagement mechanism (54) detachably connects the second front pillar trim (50) to first front pillar trim (40). The engagement mechanism (54) is configured to allow the second front pillar trim (50) to move with respect to the front pillar (10) by releasing the second front pillar trim (50) by an expansion pressure of the airbag (60) at a time of inflation of the airbag (60), so that a gap for deployment of the airbag (60) is formed between the second front pillar trim (50) and the front pillar (10).

12 Claims, 11 Drawing Sheets

(56) References Cited

U.S. PATENT DOCUMENTS

| | | |
|---|---|---|
| 2001/0022441 A1 | 9/2001 | Nakajima et al. |
| 2005/0046160 A1 | 3/2005 | Totani et al. |
| 2007/0080524 A1* | 4/2007 | Kim .......................... 280/730.2 |
| 2010/0320733 A1 | 12/2010 | Zucal et al. |
| 2011/0221170 A1* | 9/2011 | Thurston et al. ........... 280/728.1 |
| 2011/0221172 A1* | 9/2011 | She ........................... 280/730.2 |

FOREIGN PATENT DOCUMENTS

| | | |
|---|---|---|
| JP | 2000108826 | 4/2000 |
| JP | 2005035528 | 10/2005 |
| JP | 2008296645 | 11/2008 |

* cited by examiner

MOUNTING STRUCTURES FOR FRONT PILLAR TRIMS

BACKGROUND

1. Technical Field

Embodiments of the present invention relate to a mounting structure for a front pillar trim accommodating an airbag and having an assist grip.

2. Description of Related Art

A vehicle main body includes side walls (e.g., doors and body side panels), a roof panel arranged above the side walls, and pillars supporting the roof panel. The pillars include a front pillar situated in a front portion of the vehicle. Since the major portion of the front pillar is formed of a metal plate-like member (e.g., a steel plate), a front pillar trim covering the vehicle inner side of the front pillar is provided. The front pillar trim constitutes the inner wall of the vehicle interior, and, like other trim members, is formed through a combination of an appropriate synthetic resin material, a textile material, etc. Thus, the front pillar trim has a design function of forming the vehicle inner wall as a smooth surface and a function of protecting an occupant at a time of collision of the vehicle.

The vehicle may be provided with an airbag device generally referred to as a curtain airbag for protecting the occupant at the time of collision of the vehicle. The airbag device stores a folded airbag along the front pillar and roof side rail. Based on an output from a collision detection sensor mounted to the vehicle, an igniter (ignition device) operates, and an inflator (gas generator) generates gas, causing the airbag to be inflated by the gas to develop in a curtain-like fashion along the side surface of the vehicle interior. When the airbag on the inner side of the front pillar trim expands, the airbag pushes away a rear end edge portion of the front pillar trim by an expansion pressure, and forms along the side wall of the vehicle interior from a gap between the front pillar and the front pillar trim.

An assist grip that may be grasped by the occupant at the time of getting in or out of the vehicle may be attached to the front pillar. The assist grip is fastened to the front pillar, which is formed of a rigid material in order to ensure a desired level of rigidity. The front pillar trim is held between the assist grip and the front pillar, and is firmly fixed in position. Accordingly, at the time of development of the airbag, the gap between the front pillar trim and the front pillar is not easily generated, and there is a fear of the airbag not being smoothly inflated and developed.

Japanese Laid-Open Patent Application No. 2000-108826 discloses a known pillar trim mounting structure. In the front pillar trim of the structure, an easy-to-rupture portion is formed around a portion where upper and lower ends of the assist grip are fastened. The easy-to-rupture portion is ruptured by the expansion pressure of the airbag, and causes a part of the front pillar trim to move toward a center of the vehicle interior, forming a gap between the front pillar and the front pillar trim.

However, the assist grip is fastened to the front pillar that is a rigid body, so that the front pillar trim can only move to a position where it is in contact with the inner peripheral surface of the assist grip. Thus, a sufficient gap is not formed between the front pillar and the front pillar trim, and there is a fear that the airbag won't smoothly inflate and form.

Depending on an order in which the easy-to-rupture portion is ruptured, a force is locally applied to the front pillar trim due to the expansion pressure of the airbag, and there is a fear of the front pillar trim being broken and scattered. Judging from a recent increase in the expansion pressure of airbag devices, such a concern may be more realistic. In some cases, a cover is attached to the surface of the front pillar trim in order to prevent breakage of the front pillar trim. However, adding the cover involves an increase in cost.

Thus, there has been a need for a mounting structure which suppresses interference between the front pillar trim and the assist grip at the time of expansion of the airbag to enable the airbag to smoothly expand and which can suppress breakage of the front pillar trim.

SUMMARY

According to a feature of the present invention, a front pillar trim mounting structure has a front pillar, a front pillar trim, an airbag, and an assist grip. The front pillar is provided in the front portion of a vehicle. The front pillar trim covers the front pillar from the inner side of the vehicle. The airbag is located between the front pillar and the front pillar trim. The assist grip is attached to the front pillar, and is installed on a vehicle inner surface of the front pillar trim. The front pillar trim has a first front pillar trim, a second front pillar trim, and an engagement mechanism. The assist grip is installed on the first front pillar trim. The second front pillar trim is provided with an opening where the first front pillar trim is installed. The engagement mechanism detachably connects the second front pillar trim to the first front pillar trim. The engagement mechanism is configured to allow the second front pillar trim to move with respect to the front pillar. During inflation of the airbag, expansion pressure causes the release of the second front pillar trim so that a gap for expansion of the airbag is formed between the second front pillar trim and the front pillar.

Thus, at the time of inflation of the airbag, the engagement mechanism is released, whereby the second front pillar trim can be easily detached from the first front pillar trim. At the time of inflation of the airbag, the first front pillar trim is retained by the front pillar together with the assist grip. However, the second front pillar trim has an opening, so that the second front pillar trim can be detached from the first front pillar trim with little or no interference from the first front pillar trim and the assist grip. As a result, the gap for expansion can assuredly be formed, enabling the airbag to be smoothly inflated.

At the time of inflation of the airbag, the second from pillar trim is detached from the first front pillar trim, and does not easily interfere with the assist grip. Thus, it is possible to suppress local application of a load to the front pillar trim due to the expansion pressure of the airbag. Thus, it is possible to suppress breakage of the front pillar trim.

DETAILED DESCRIPTION

Figure 1:
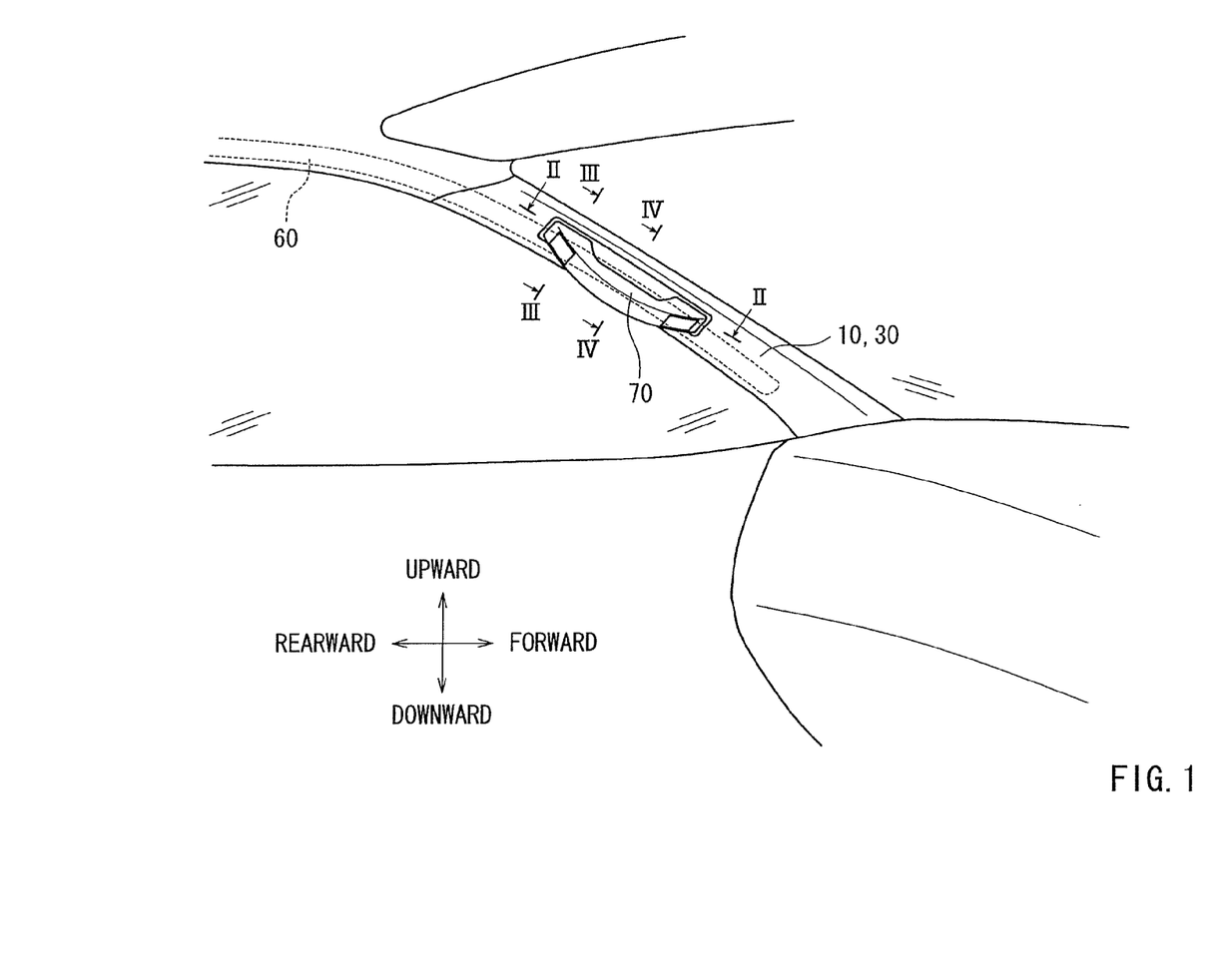
FIG. 1 is a perspective view of a part of vehicle near a front pillar.

An embodiment will be described with reference to FIGS. 1 to 4. The front pillar trim mounting structure shown in FIG. 1 has a front pillar 10, a front pillar trim 30, an airbag 60, and an assist grip 70. As shown in FIGS. 1 and 3, the front pillar 10 is arranged between a main body and a roof panel of a vehicle. Among the pillars supporting the roof panel, the front pillar 10 is situated in the front portion of the vehicle. The front pillar trim 30 covers a vehicle inner side of the front pillar 10. The airbag 60 is located between the front pillar 10 and the front pillar trim 30. The assist grip 70 is attached to the front pillar 10, and extends in a longitudinal direction of a vehicle inner side surface of the front pillar trim 30.

Figure 3:
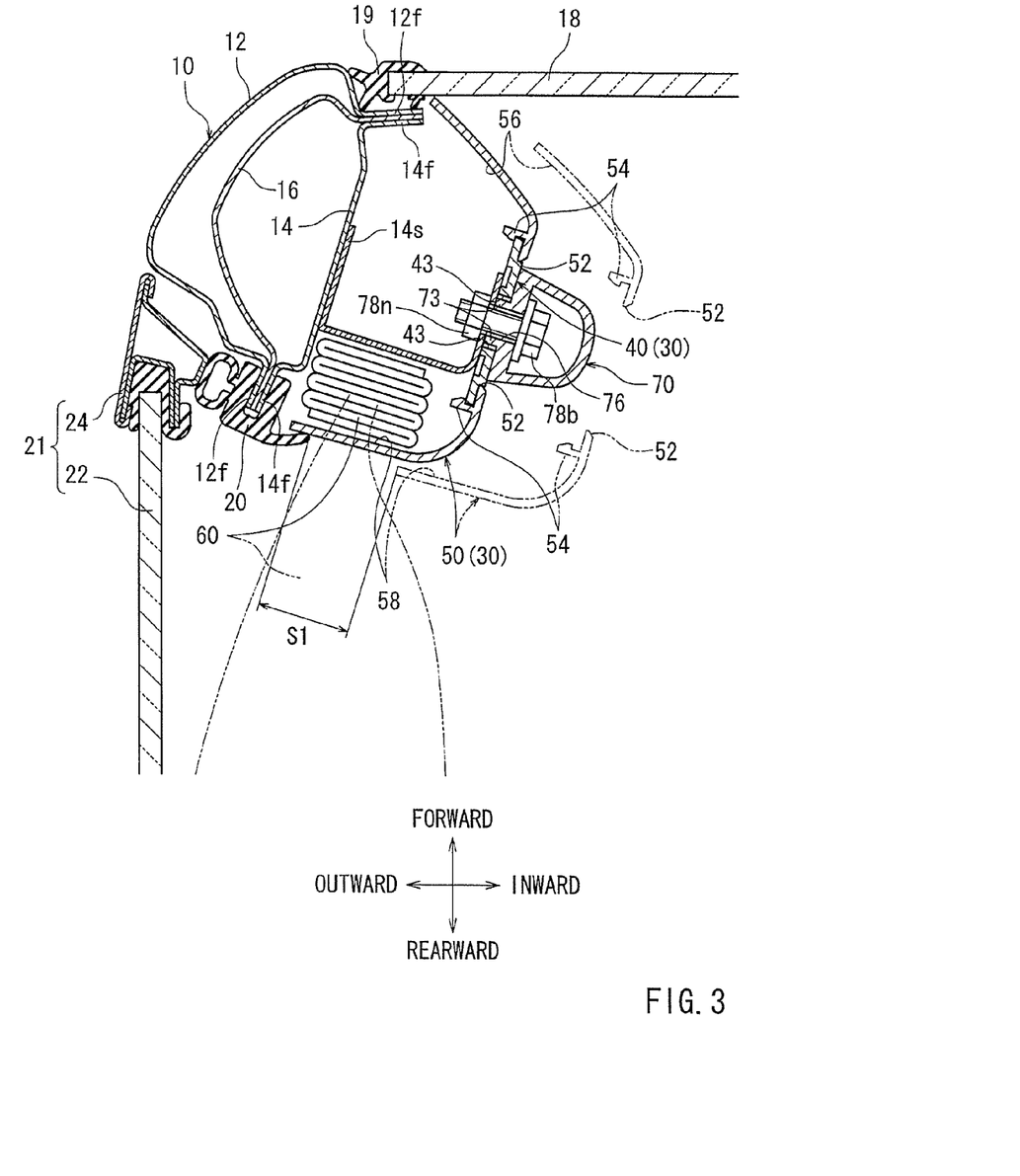
FIG. 3 is a cross-sectional view taken along line III-III in FIG. 1.
Figure 4:
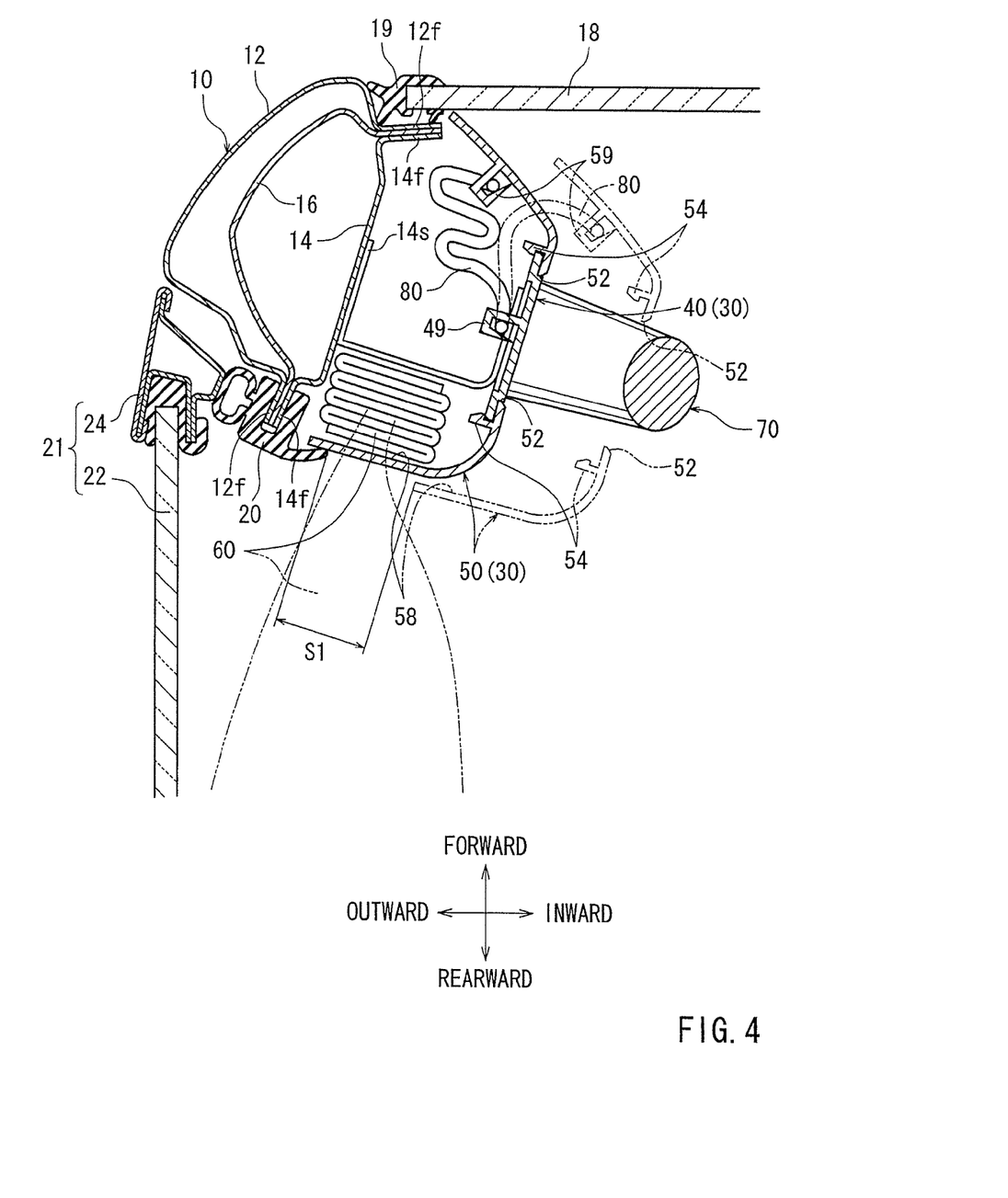
FIG. 4 is a cross-sectional view taken along line IV-IV in FIG. 1.

As shown in FIGS. 3 and 4, the front pillar 10 has an outer panel 12, an inner panel 14 and a metal reinforcement 16. The outer panel 12 is formed of a steel plate, and constitutes an outer wall of the vehicle. The inner panel 14 is formed of a steel plate. The inner panel 14 is situated on an inner side of the vehicle to form a vehicle interior. The metal reinforcement 16 is held between the outer panel 12 and the inner panel 14 and reinforces the rigidity of the outer panel 12 and the inner panel 14. Flange portions 12f and 14f are formed at both edges of the outer panel 12 and of the inner panel 14. The end edges of the metal reinforcement 16 are situated between the flange portions 12f and 14f. The flange portions 12f and 14f are bonded together by spot welding. As a result, the inner panel 14 exhibits a closed cross-sectional configuration.

As shown in FIGS. 3 and 4, an end portion of a windshield 18 is situated in the vicinity of the flange portions 12f and 14f at one end of the front pillar 10. The gap between the outer panel 12 and the windshield 18 is filled by a seal 19, and the windshield 18 is supported by the front pillar 10 via the seal 19. A door seal 20 is attached to the flange portions 12f and 14f at the other end of the front pillar 10.

As shown in FIGS. 3 and 4, a front door 21 is provided on a vehicle outer side of the door seal 20. The front door 21 has a frame-like door sash 24, and a front door windowpane 22 arranged within the frame. When the front door 21 is closed, the door seal 20 is brought into close contact with the door sash 24 to seal the vehicle interior. The front pillar trim 30 is provided on a vehicle inner side of the front pillar 10. The front pillar trim 30 covers the entire inner panel 14.

As shown in FIGS. 3 and 4, the airbag 60 of an airbag device for protecting an occupant is located between the inner panel 14 and the front pillar trim 30. The airbag 60 is folded and stacked in a front-rear direction. The airbag 60 extends in the vertical direction. As shown in FIG. 1, the airbag 60 is arranged to extend from the front pillar 10 along a roof side rail. The roof side rail is situated at an end edge in the vehicle width direction of a roof trim, and is covered by the roof trim. An inflator (not shown) is provided at a lower end portion of the front pillar 10 or at a rear portion of the roof side rail.

The vehicle is provided with a collision detection sensor. When the collision detection sensor outputs a signal, an igniter (ignition device) (not shown) is operated, and an inflator (gas generator) generates gas. The gas is introduced into the airbag 60, and the airbag 60 inflates, forming in a curtain-like fashion along the side surface of the vehicle interior. Thus, at the time of collision, the airbag 60 can protect the occupant.

Figure 2:
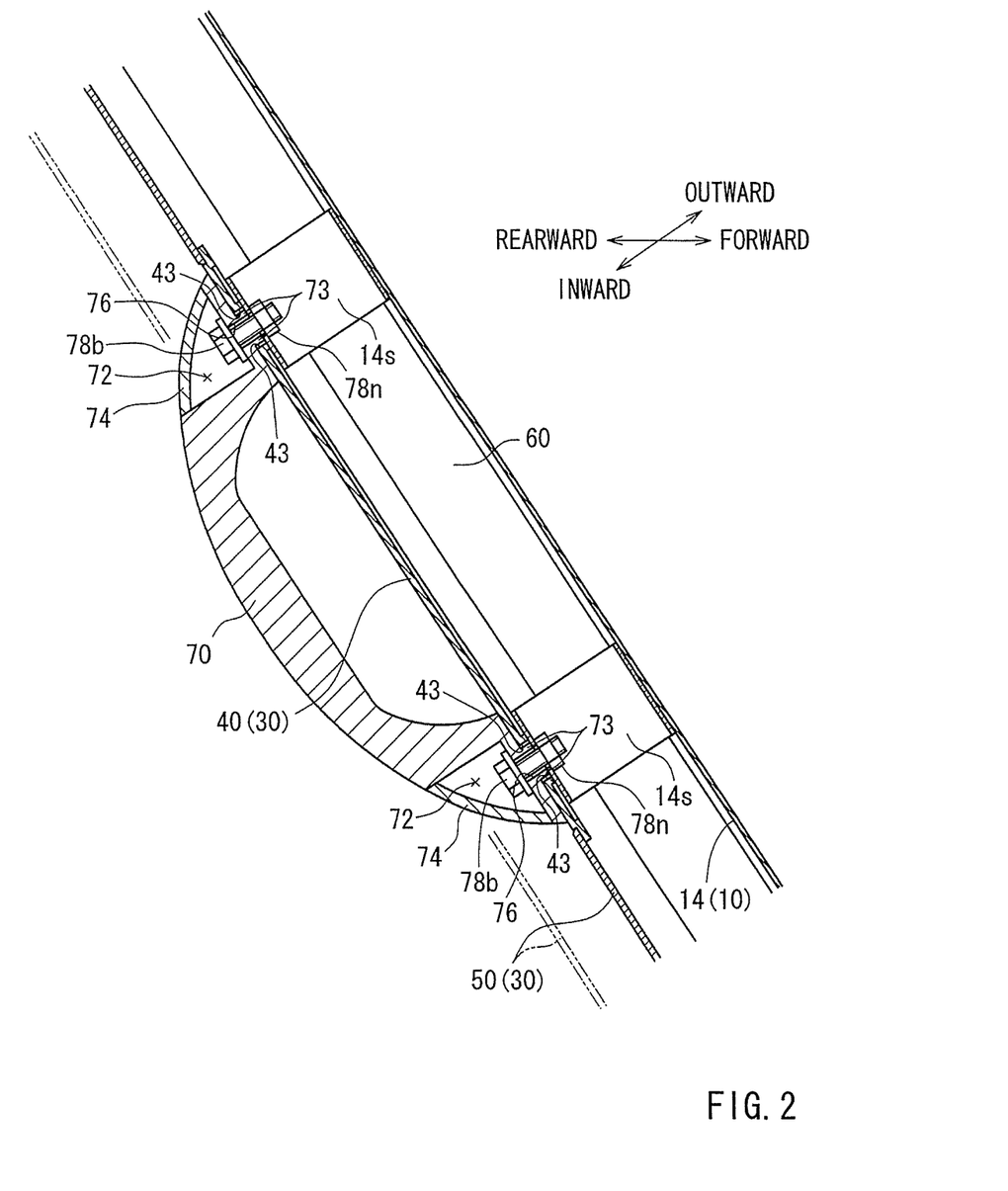
FIG. 2 is a cross-sectional view taken along line II-II in FIG. 1.

As shown in FIGS. 2 and 3, the assist grip 70 is attached to the front pillar 10, and extends in the longitudinal direction on the vehicle inner side surface of the front pillar trim 30. The assist grip 70 is grasped by the occupant seated on a front seat at the time of getting in or out of the vehicle, making it easy for the occupant to get in or out of the vehicle. An upper portion and a lower portion of the assist grip 70 are fastened by bolts 78b and nuts 78n to a stand 14s provided on the inner panel 14. A first front pillar trim 40 of the front pillar trim 30 is partially held between the assist grip 70 and the stand 14s. Recesses 72 capable of receiving bolts 78b can be formed at the upper and lower portions of the assist grip 70. The open portions of the recesses 72 are covered by resin caps 74. First insertion holes 76 are formed at bottoms of the recesses 72.

As shown in FIG. 2, the bolts 78b are inserted into the first insertion holes 76 and are threadedly engaged with the nuts 78n provided on a back surface of the stand 14s. The back surfaces of the recesses 72 of the assist grip 70 are held in contact with the first front pillar trim 40. Protruding boss portions 73 are formed on the back surface. The boss portions 73 are fit-engaged with recessed portions 43 of the first front pillar trim 40, thereby setting the assist grip 70 in position with respect to the front pillar trim 30.

As shown in FIG. 2, the first front pillar trim 40 has fastening portions which connect the upper and lower portions of the assist grip 70 to the stand 14s. The fastening portions have recessed portions 43 to be fit-engaged with the boss portions 73. The recessed portions 43 may be through-holes or recesses. The fit tolerance of the boss portions 73 and the recessed portions 43 can be set tightly to ensure mutual positioning between the assist grip 70 and the first front pillar trim 40.

As shown in FIGS. 2 to 4, the front pillar trim 30 is arranged on the vehicle inner side with respect to the front pillar 10. The front pillar trim 30 is an elongated plate-like member, which can be formed through molding of synthetic resin material. The front pillar trim 30 has an outer surface forming a smooth and planar vehicle inner wall as a design function. For decorative purposes, a cover may be attached to the front pillar trim 30. The front pillar trim 30 helps to mitigate the shock of a so-called secondary collision, in which the occupant collides with the front pillar 10 at the time of collision of the vehicle. Thus, the front pillar trim 30 may function in protecting the occupant at the time of collision of the vehicle.

As shown in FIGS. 2 to 4, the front pillar trim 30 is composed of the first front pillar trim 40 and a second front pillar trim 50 formed separately from each other. The first front pillar trim 40 is of a substantially rectangular configuration, covering the region where the assist grip 70 is arranged. The first front pillar trim 40 is fixed to the stand 14s by the assist grip 70. The second front pillar trim 50 is of a configuration entirely covering the region of the inner panel 14 other than the region where the first front pillar trim 40 is arranged. It is possible to entirely cover the inner panel 14 with the first front pillar trim 40 and the second front pillar trim 50.

As shown in FIGS. 2 to 4, the second front pillar trim 50 has an opening 52 where the first front pillar trim 40 is arranged. At least two claw members (engagement mechanisms) 54 are provided at an inner peripheral edge portion of the opening 52. The claw members 54 protrude toward the inner panel 14. The claw members 54 are formed integrally with the second front pillar trim 50 of a synthetic resin material similar to that of the second front pillar trim 50. The claw members 54 can be engaged with the first front pillar trim 40 through elastic deformation. Connection members (not shown) protruding inward and outward are formed on the upper and lower portions of the second front pillar trim 50. The upper connection member is inserted into the roof trim or the roof rail trim for engagement therewith. The lower connection member is inserted into a side portion of an instrument panel for engagement therewith.

As shown in FIG. 4, the first front pillar trim 40 and the second front pillar trim 50 are connected together by a strap (detachment prevention mechanism) 80. The strap 80 prevents the second front pillar trim 50 from occupying a space inside the vehicle interior beyond the dimension of a development gap S1 for the airbag. The strap 80 is a cord-like object durable enough to withstand breakage due to the expansion pressure of the airbag. The strap 80 can be formed of natural fiber, synthetic resin material, metal or the like. One end of the strap 80 is mounted to a first fixation portion 49 provided on the back surface of the first front pillar trim 40. The back surface is opposite the inner panel 14. The other end of the strap 80 is mounted to a second fixation portion 59 provided on the inner surface of the second front pillar trim 50. The inner surface is opposite the inner panel 14. The second fixation portion 59 is provided on an inner surface 56 situated on the vehicle front side. The airbag 60 is provided on an inner surface 58 situated on the vehicle rear side.

As shown in FIGS. 2 to 4, normally, the second front pillar trim 50 is connected with the first front pillar trim 40 by the claw members 54. When the collision detection sensor outputs a signal, the igniter (ignition device) is operated based on the signal, and the inflator (gas generator) generates gas, with the airbag 60 being deployed by the gas. Due to the inflation of the airbag 60, the claw members 54 are detached from the first front pillar trim 40, and the second front pillar trim 50 moves inward within the vehicle interior. The development gap S1 for the airbag 60 is formed between the second front pillar trim 50 and the front pillar 10. The strap 80 regulates the inward movement of the second front pillar trim 50 so as to restrict the size of the development gap S1 for the airbag 60 to a predetermined dimension. The airbag 60 is developed in a curtain-like fashion from the development gap S1 along the vehicle interior side surface.

As described above, the front pillar trim 30 has the first front pillar trim 40 and the second front pillar trim 50 separate from each other (see FIG. 3). The opening 52 where the front pillar trim 40 is arranged is formed in the second front pillar trim 50. There are provided the claw members (engagement mechanisms) 54 for detachably connecting the first front pillar trim 40 and the second front pillar trim 50 to each other. As a result of the inflation of the airbag 60, the claw members 54 are released from the first front pillar trim 40, and the second front pillar trim 50 moves inward inside the vehicle interior. In this way, a development gap S1 for the airbag 60 is formed between the second front pillar trim 50 and the front pillar.

Thus, due to the releasing of the claw members 54 at the time of inflation of the airbag 60, the second front pillar trim 50 can be easily detached from the first front pillar trim 40. At the time of inflation of the airbag 60, the first front pillar trim 40 is retained by the front pillar 10 together with the assist grip 70. However, the second front pillar trim 50 has the opening 52, so that it can be detached from the first front pillar trim 40 while involving little or no interference with the first front pillar trim 40 and the assist grip 70. As a result, the development gap S1 is assuredly formed, enabling the airbag 60 to be smoothly inflated.

At the time of inflation of the airbag 60, the second front pillar trim 50 is detached from the first front pillar trim 40, and does not easily interfere with the assist grip 70. As a result, it is possible to suppress local force applied to the front pillar trim 30 due to the expansion pressure of the airbag 60. Thus, it is possible to suppress generation of breakage of the front pillar trim 30.

As shown in FIG. 4, the present mounting structure has the strap (detachment prevention mechanism) 80. The strap 80 regulates the movement amount of the second front pillar trim 50 with respect to the front pillar 10 so as to prevent the development gap S1 from attaining a size equal to or bigger than a predetermined size. Thus, in forming the development gap S1, the strap 80 can prevent the front pillar trim 30 from being scattered.

Figure 5:
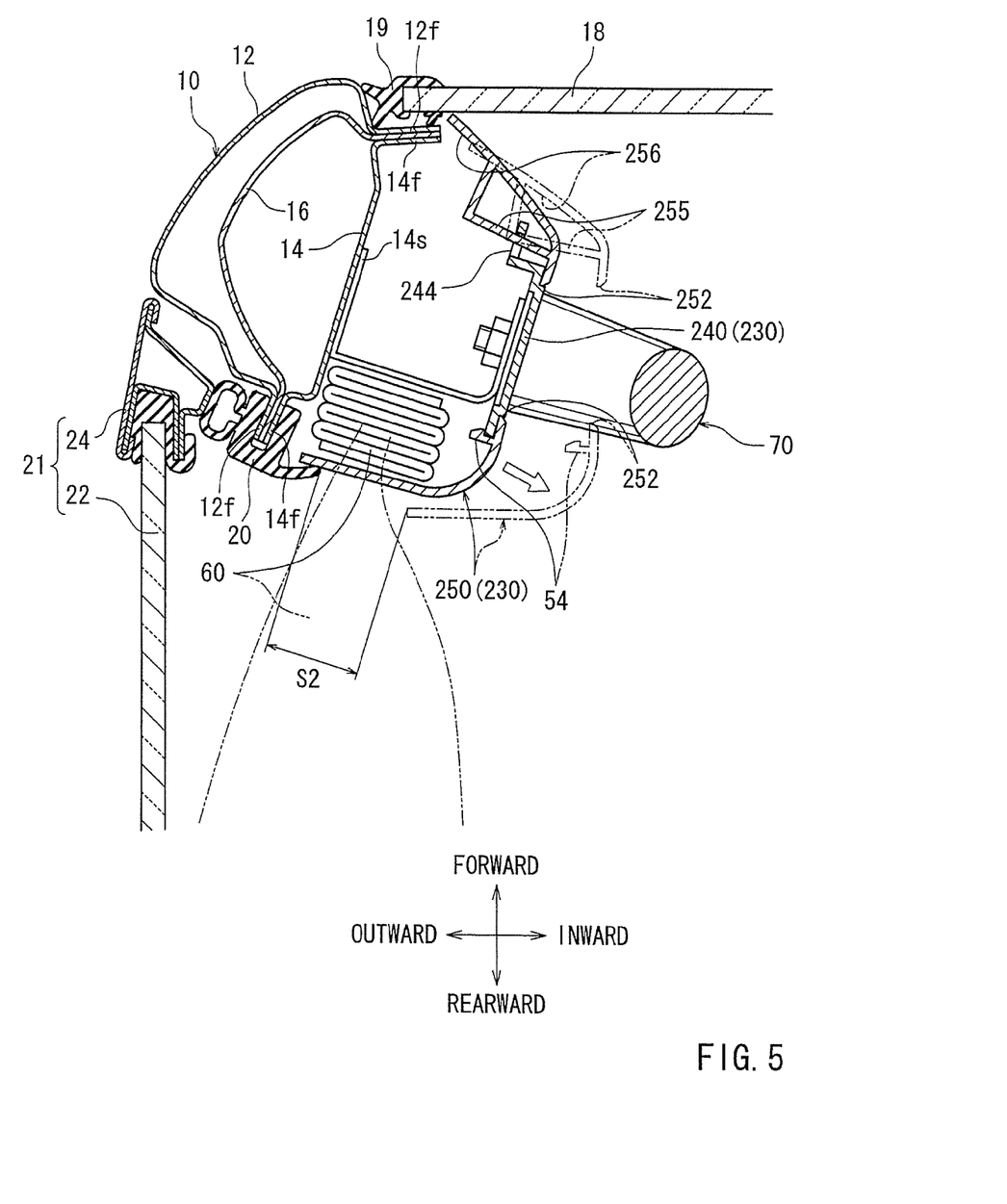
FIG. 5 is a cross-sectional view of a part, corresponding to FIG. 4, of a vehicle having another configuration.
Figure 6:
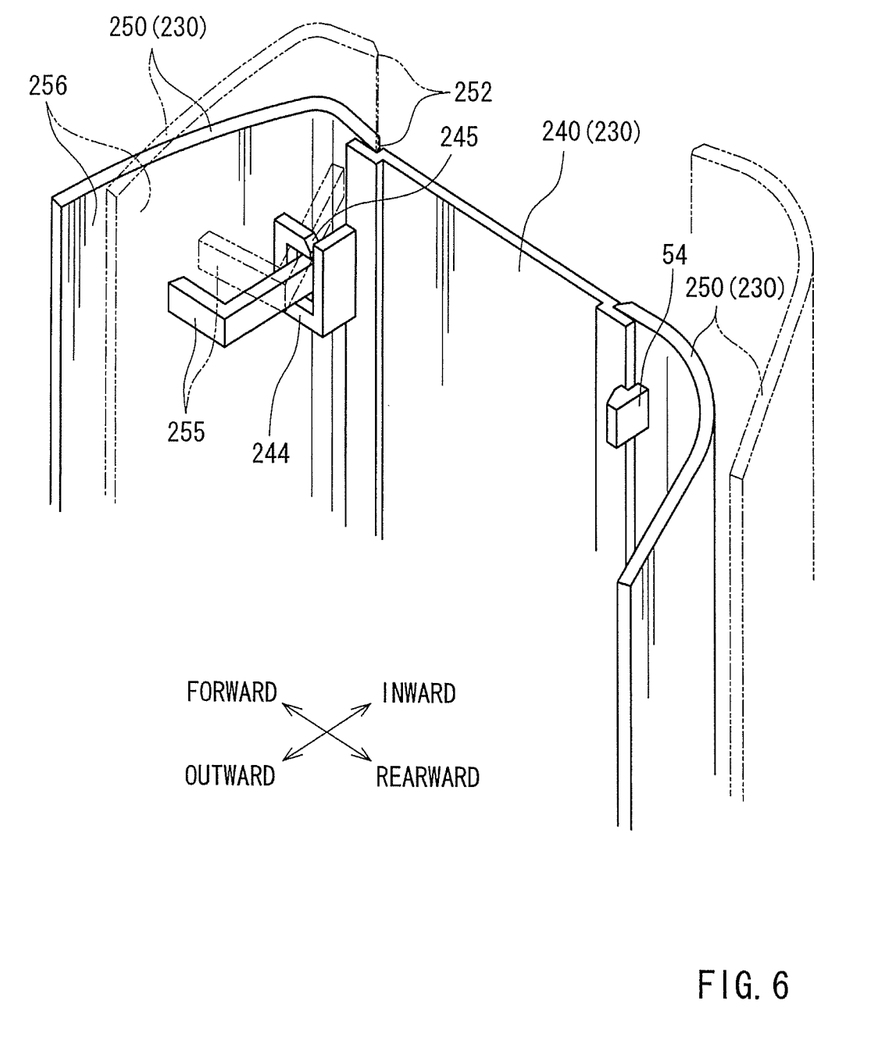
FIG. 6 is a perspective view of a detachment prevention mechanism in the configuration shown in FIG. 5.

Instead of the structure shown in FIGS. 1 to 4, the present embodiment may have a structure shown in FIGS. 5 and 6. In FIGS. 5 and 6, components that are the same as those of FIGS. 1 to 4 are indicated by the same reference numerals. As shown in FIGS. 5 and 6, a front pillar trim 230 has a detachment prevention mechanism. The detachment prevention mechanism has a second front pillar trim 250 hinge-connected to a first front pillar trim 240 so as to be rotatable in a door-like fashion. A rectangular frame-like portion 244 protruding to the vehicle front side is integrally provided on a front portion of the first front pillar trim 240. The frame-like portion 244 has a separation portion 245 where it is partially separated in the peripheral direction.

As shown in FIGS. 5 and 6, a rib 255 is integrally formed on the second pillar trim 250. The rib 255 is a bar-like member connecting an inner surface 256 of a front portion of the second front pillar trim 250 with an inner surface thereof in the vicinity of an opening 252. The rib 255 enters the frame-like portion 244 through the separation portion 245 of the frame-like portion 244. Through the insertion of the rib 255 into the frame-like portion 244, the second front pillar trim 250 is mounted to the front pillar trim 240.

As shown in FIGS. 5 and 6, at the time of inflation of the airbag 60, the second front pillar trim 250 rotates around the front portion, forming a development gap S2 at the rear portion of the second front pillar trim 250. As a result, the airbag 60 deploys from the development gap S2. Thus, the structure shown in FIGS. 5 and 6 may result the same effect as that of the structure shown in FIGS. 1 to 4.

The detachment prevention mechanism shown in FIGS. 5 and 6 has a structure in which the second front pillar trim 250 is rotatably connected to the first front pillar trim 240. The airbag 60 is installed in the vicinity of the rotation tip end of the second front pillar trim 250. Thus, at the time of inflation of the airbag 60, the second front pillar trim 250 rotates, and the development gap S2 is formed in the vicinity of the rotation tip end, where the movement amount is large. Thus, the development gap S2 can be formed efficiently.

Figure 7:
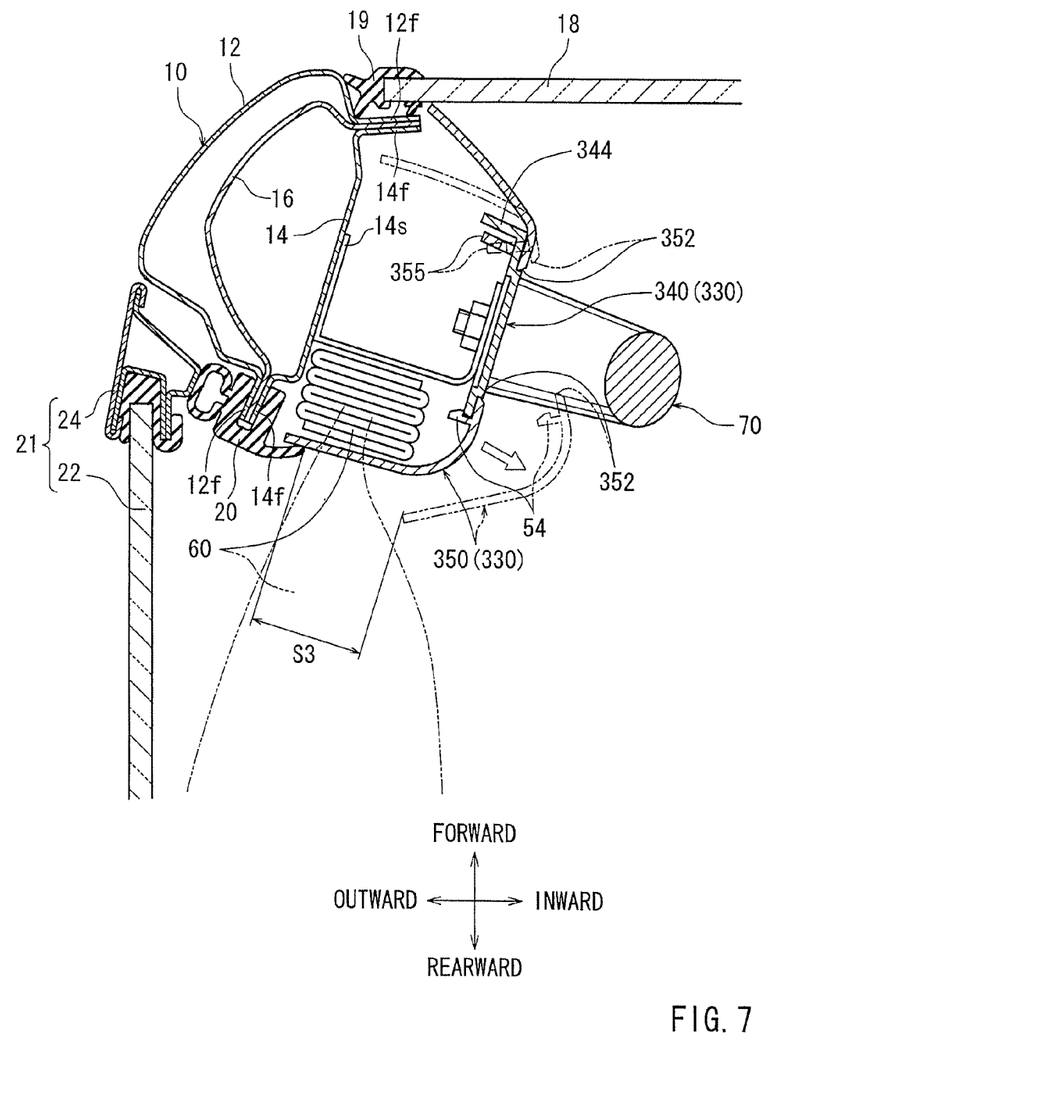
FIG. 7 is a cross-sectional view of a part, corresponding to FIG. 4, of a vehicle having the other configuration.
Figure 8:
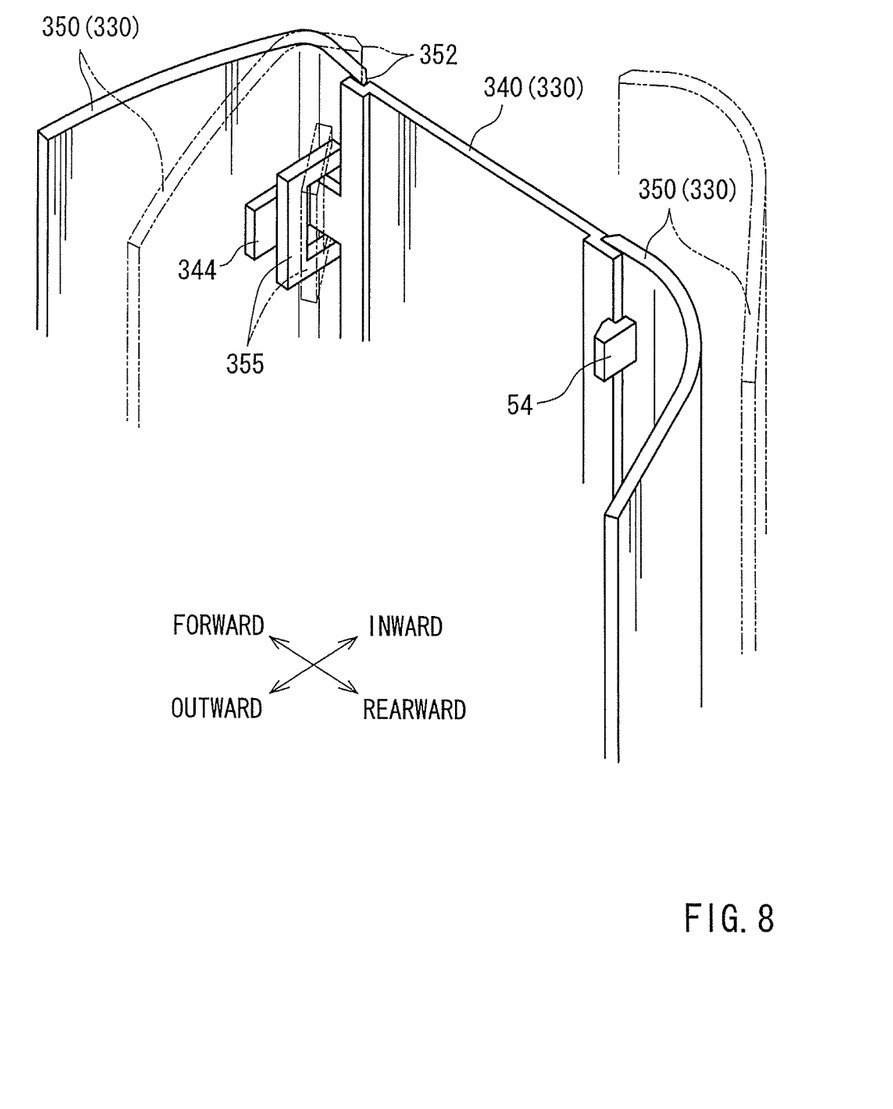
FIG. 8 is a perspective view of a detachment prevention mechanism in the configuration shown in FIG. 7.

Instead of the structure shown in FIGS. 5 and 6, an embodiment may have a structure shown in FIGS. 7 and 8. In FIGS. 7 and 8, components that are the same as those of FIGS. 5 and 6 are indicated by the same reference numerals. As shown in FIGS. 7 and 8, a second front pillar trim 350 of a front pillar trim 330 integrally has a rectangular frame-like portion 355 protruding toward the inner panel 14 on a vehicle front side of an opening 352. A first front pillar trim 340 integrally has a claw member 344 protruding into the frame-like portion 355. The claw member 344 is inserted into the frame-like portion 355 from the vehicle rear side to the vehicle front side. As a result, the second front pillar trim 350 is rotatably connected to the first front pillar trim 340.

As shown in FIGS. 7 and 8, at the time of inflation of the airbag 60, the second front pillar trim 350 rotates around the claw member 344, and a development gap S3 is formed at a rear portion of the second front pillar trim 350. As a result, the airbag 60 is developed from the development gap S3. Thus, the structure shown in FIGS. 7 and 8 may also result the same effect as that of the structure shown in FIGS. 5 and 6.

Figure 9:
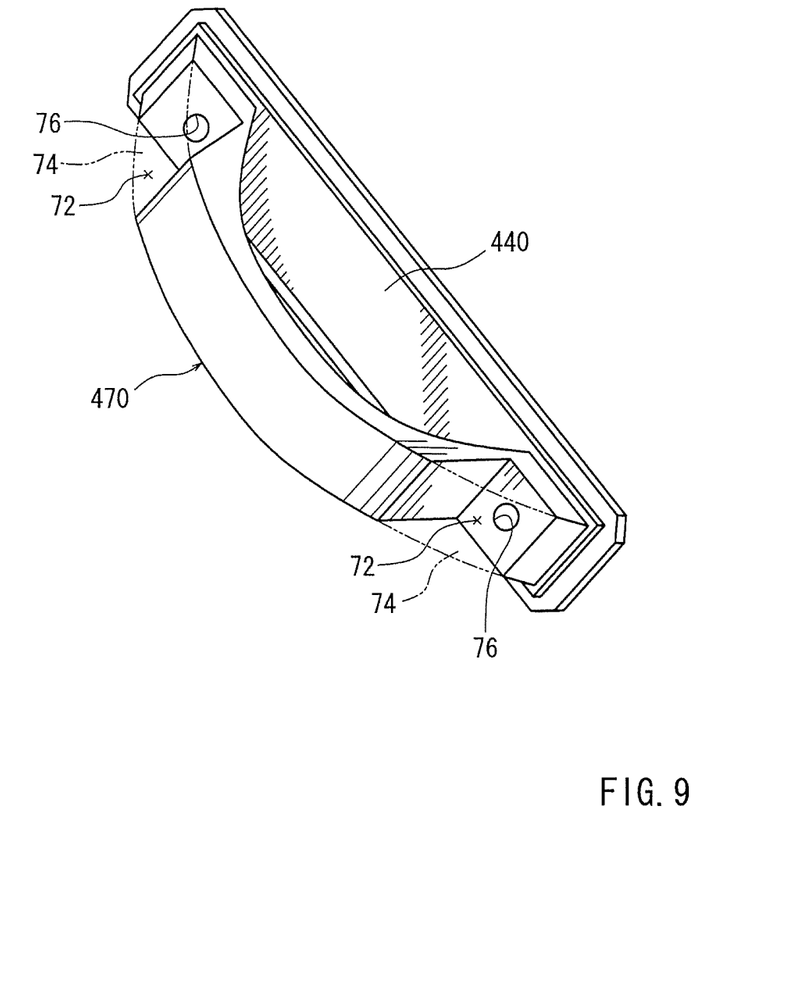
FIG. 9 is a perspective view of an assist grip having another configuration.
Figure 10:
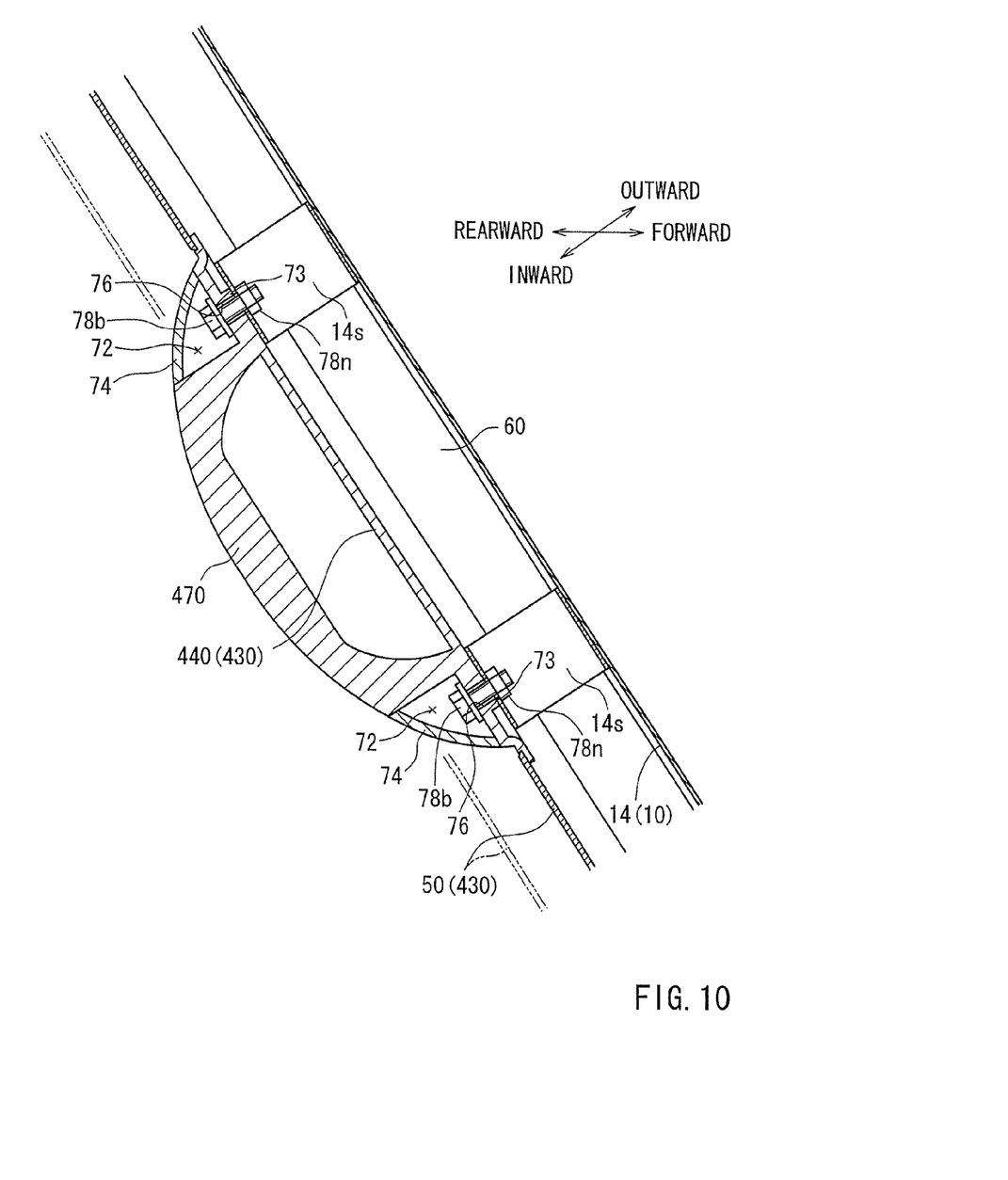
FIG. 10 is a cross-sectional view of a part, corresponding to FIG. 2, of a vehicle having the assist grip of FIG. 9.
Figure 11:
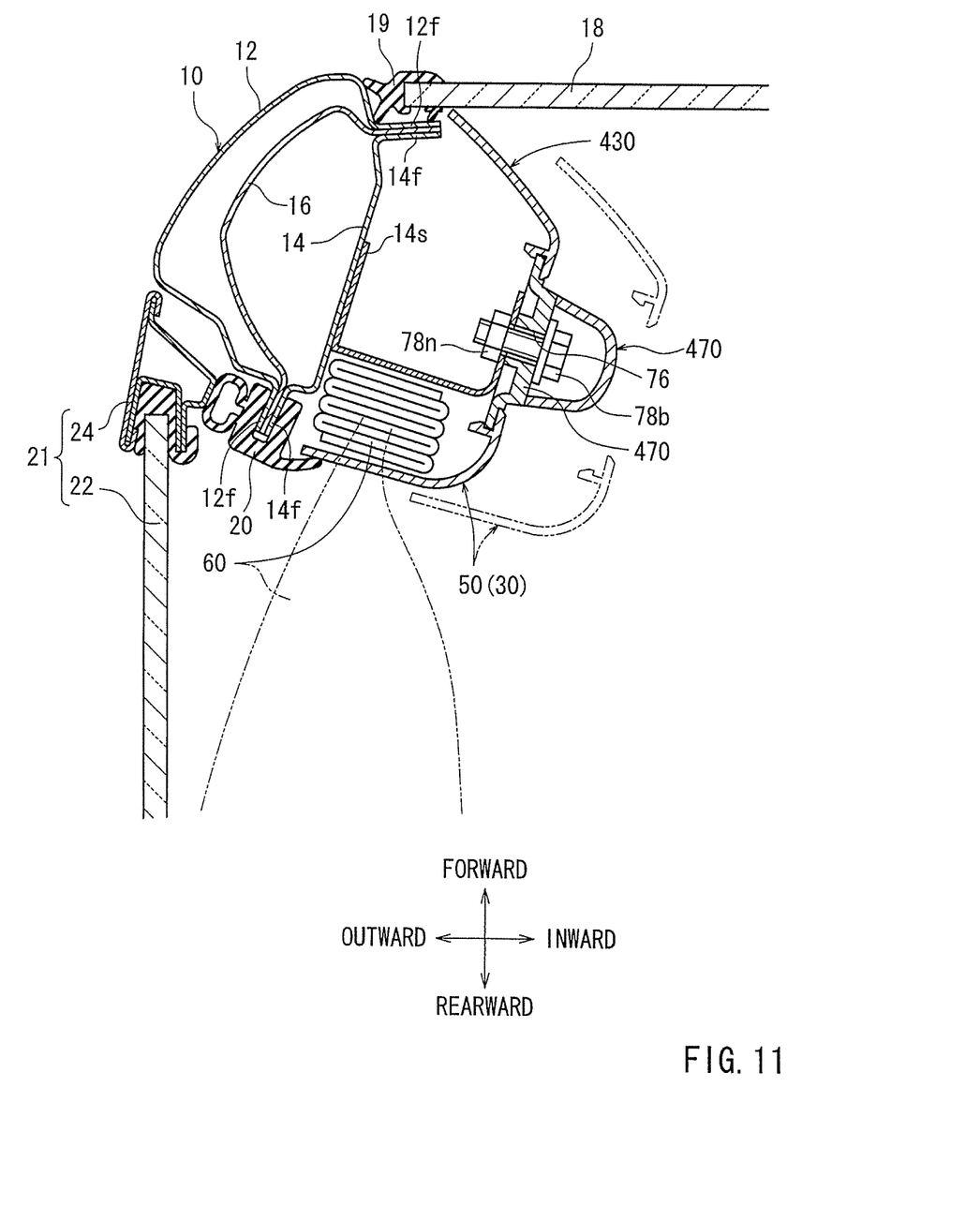
FIG. 11 is a cross-sectional view of a part, corresponding to FIG. 3, of the vehicle having the assist grip of FIG. 9.

Instead of the structures shown in FIGS. 1 to 8, an embodiment may have a structure shown in FIGS. 9 to 11. In FIGS. 9 to 11, components that are the same as those shown in FIGS. 1 to 8 are indicated by the same reference numerals. As shown in FIGS. 9 to 11, an assist grip 470 of a front pillar trim 430 is formed integrally with a first front pillar trim 440. The structure shown in FIGS. 9 to 11 may result the same effect as that of the structures shown in FIGS. 1 to 8. Furthermore, the structure shown in FIGS. 9 to 11 helps to suppress an increase in the number of components and to achieve a reduction in the number of mounting operations.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

An angle portion protruding toward the inner panel may be provided at the inner peripheral edge portion of the opening of a second front pillar trim. The angle portion is in contact with the outer peripheral edge portion of the first front pillar trim, and allows relative positional matching between the second front pillar trim and the first front pillar trim. As a result, the mating portion between the two components may be formed as a uniform groove, whereby it may improve in terms of its design.

The outer peripheral portion of the first front pillar trim may have an overlapping portion overlapping the second front pillar trim. The overlapping portion is set to have a depth equal to the thickness of the second front pillar trim near the inner panel. This helps to improve the design of the mating portion between the two components.

Instead of the claw members 54, the engagement mechanism may have some other structure. In the normal condition when the airbag is not being inflated, this other structure can detachably connect the first front pillar trim and the second front pillar trim to each other.

The claw members may be formed integrally with the second front pillar trim, or formed separately and mounted to the second front pillar trim. The claw members may be formed of a material different from that of the second front pillar trim, and mounted to the second front pillar trim.

The detachment prevention mechanism may be provided between the front pillar and the second front pillar trim. For example, it may be a resin clip connecting the front pillar and the second front pillar trim to each other.

The invention claimed is:

1. A front pillar trim mounting structure comprising:
a front pillar provided in a front portion of a vehicle;
a front pillar trim covering the front pillar from an inner side of the vehicle;
an airbag located between the front pillar and the front pillar trim; and
an assist grip attached to the front pillar, and installed on a vehicle inner surface of the front pillar trim,
wherein the front pillar trim comprises
a first front pillar trim on which the assist grip is installed,
a second front pillar trim provided with an opening where the first front pillar trim is installed,
a tip portion of the second front pillar trim wherein the airbag is installed in the vicinity of the tip portion,
a base portion of the second front pillar trim, opposing to the tip portion,
an engagement mechanism detachably connecting the tip portion of the second front pillar trim to the first front pillar trim, and the engagement mechanism being configured to allow the tip portion to move with respect to the front pillar by releasing the tip portion by an expansion pressure of the airbag at a time of inflation of the airbag, so that a gap for a deployment of the airbag is formed between the tip portion and the front pillar,
a rib provided on the base portion of the second front pillar trim,
a frame-like portion provided on the first front pillar trim wherein the rib is inserted into the frame-like portion so that the frame-like portion allows the rib to slide along the frame-like portion while the frame-like portion allows the second front pillar trim to rotate about the frame-like portion.

2. The front pillar trim mounting structure of claim 1, wherein the assist grip and the first front pillar trim are integrally formed.

3. The front pillar trim mounting structure of claim 1, further comprising a detachment prevention mechanism configured to regulate a movement amount of the second front pillar trim with respect to the front pillar so as to prevent the development gap from attaining a size equal to or bigger than a predetermined size.

4. The front pillar trim mounting structure of claim 3,
wherein the detachment prevention mechanism comprises a structure in which the second front pillar trim is rotatably connected to the first front pillar trim, and
wherein the airbag is installed in a vicinity of a rotation tip end of the second front pillar trim.

5. The front pillar trim mounting structure of claim 4, wherein the assist grip and the first front pillar trim are integrally formed.

6. The front pillar trim mounting structure of claim 3, wherein the assist grip and the first front pillar trim are integrally formed.

7. A front pillar trim mounting structure comprising:
a front pillar provided in a front portion of a vehicle;
a front pillar trim covering the front pillar from an inner side of the vehicle;
an airbag located between the front pillar and the front pillar trim; and
an assist grip attached to the front pillar, and installed on a vehicle inner surface of the front pillar trim,
wherein the front pillar trim comprises
a first front pillar trim on which the assist grip is installed,
a second front pillar trim provided with an opening where the first front pillar trim is installed,
a tip portion of the second front pillar trim wherein the airbag is installed in the vicinity of the tip portion,
a base portion of the second front pillar trim, opposing to the tip portion,
an engagement mechanism detachably connecting the tip portion of the second front pillar trim to the first front pillar trim, and the engagement mechanism being configured to allow the tip portion to move with respect to the front pillar by releasing the tip portion by an expansion pressure of the airbag at a time of inflation of the airbag, so that a gap for a deployment of the airbag is formed between the tip portion and the front pillar, a frame-like portion provided on the base portion of the second front pillar trim, a claw member provided on the first front pillar trim wherein the claw member is inserted into the frame-like portion so that the frame-like portion allows the second front pillar trim to rotate about the frame-like portion.

8. The front pillar trim mounting structure of claim 7, wherein the assist grip and the first front pillar trim are integrally formed.

9. The front pillar trim mounting structure of claim 7, further comprising a detachment prevention mechanism configured to regulate a movement amount of the second front pillar trim with respect to the front pillar so as to prevent the development gap from attaining a size equal to or bigger than a predetermined size.

10. The front pillar trim mounting structure of claim 9,
wherein the detachment prevention mechanism comprises
a structure in which the second front pillar trim is rotatably connected to the first front pillar trim, and
wherein the airbag is installed in a vicinity of a rotation tip end of the second front pillar trim.

11. The front pillar trim mounting structure of claim 10, wherein the assist grip and the first front pillar trim are integrally formed.

12. The front pillar trim mounting structure of claim 9, wherein the assist grip and the first front pillar trim are integrally formed.

\* \* \* \* \*